United States Patent [19]

van Twuyver

[11] Patent Number: 4,501,382
[45] Date of Patent: Feb. 26, 1985

[54] APPARATUS FOR DISPENSING MOLLUSKS

[76] Inventor: Robert van Twuyver, 258 High St., Ipswich, Mass. 01938

[21] Appl. No.: 443,905

[22] Filed: Nov. 23, 1982

[51] Int. Cl.³ ............................................. B65G 65/38
[52] U.S. Cl. ....................................... 222/63; 222/64; 222/199; 222/405; 198/444
[58] Field of Search ............... 198/396, 443, 444, 453, 198/524; 221/14, 171, 172, 174, 190, 200, 253, 194, 195, 279; 222/63, 66, 160, 162, 196, 199, 64, 405, 409; 414/413, 422

[56] References Cited

U.S. PATENT DOCUMENTS

| Re. 30,374 | 8/1980 | Spencer | 222/405 X |
|---|---|---|---|
| 472,020 | 5/1892 | Acker | 222/405 X |
| 1,892,790 | 3/1932 | Smelser | 222/66 X |
| 2,359,367 | 10/1944 | Kerr-Lawson | 222/160 X |
| 2,449,395 | 9/1948 | Lakso | 222/405 X |
| 3,499,519 | 3/1970 | Belk et al. | 221/253 X |
| 3,703,232 | 11/1972 | Zbiegien | 221/171 X |
| 3,730,386 | 4/1973 | Monsees | 198/444 X |
| 4,312,461 | 1/1982 | Godley, Sr. | 221/190 X |

Primary Examiner—Joseph J. Rolla
Assistant Examiner—Lawrence J. Miller
Attorney, Agent, or Firm—Maurice R. Boiteau

[57] ABSTRACT

A reservoir and chute cooperate to deliver mollusks such as clams, oysters, scallops and the like, oriented in a row to a conveyor forming a part of an apparatus for removing their shells. The reservoir in which an appropriate supply of mollusks is stored and from which they are delivered to the chute is provided with an elevator mechanism for maintaining the top of the supply above the upper end of the chute so that mollusks are supplied from the top of the supply to the chute in which they are advanced toward the lower discharge end by a combination of gravity and controlled vibration.

9 Claims, 3 Drawing Figures

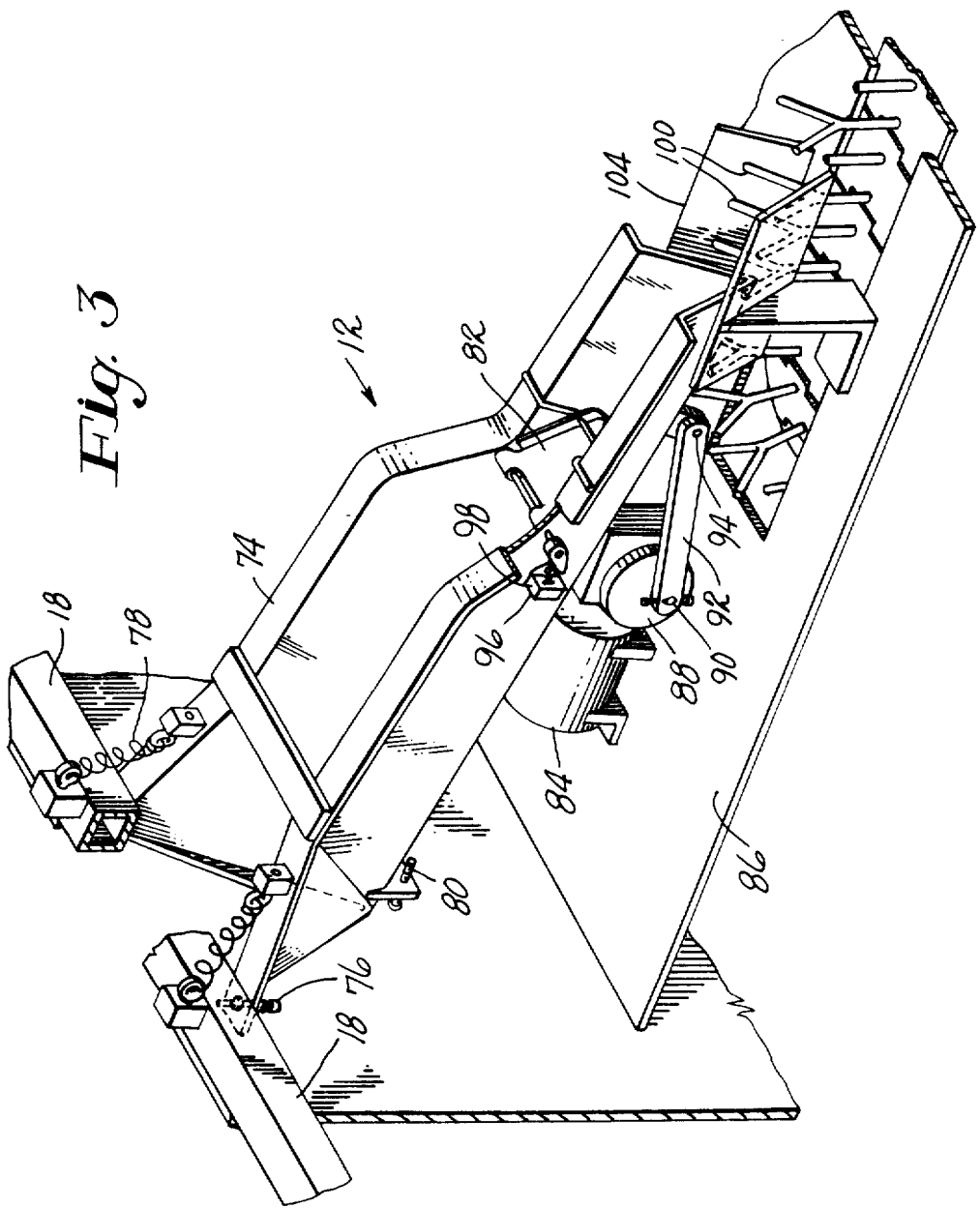

APPARATUS FOR DISPENSING MOLLUSKS

The present invention relates generally to improvements in article dispensing apparatus, but more particularly to such apparatus which is suited to the feeding in a single file of oriented mollusks, generally referred to in the course of this specification as bivalves or clams but intended to include all edible mollusks which are adapted to being processed by apparatus for removing their shells automatically or for performing other operations on them.

There is disclosed in U.S. Pat. No. 4,236,276, granted Dec. 2, 1980 upon application filed in the names of Robert Van Twuyver and James M. Johnson, a method and apparatus for shucking bivalve mollusks. In the patented apparatus, individual bivalves are introduced onto carriers from a hopper having a discharge conveyor chute "of conventional design". In fact, various conventional hopper and chute combinations were tried with generally unsatisfactory results. While the apparatus and method described in detail in the Van Twuyver et al patent functioned well for their intended purpose of shucking bivalves advanced through the apparatus on carriers, the supplying of clams and other bivalves by various hopper and chute combinations considered "conventional", usually failed to achieve the reliability of delivery which is essential to the efficient operation of the shucking apparatus.

In most instances, the failure to feed uninterruptedly was the result of either of two causes: first, the tendency of numbers of bivalves, having rough exteriors, to form a flow restricting dam akin to a logjam and second, the fragile nature of the shells which usually caused an unacceptably high proportion of broken shells if excessive vibration or other force were applied in attempts to prevent or dissolve stoppages. The result was that, in order to avoid excessive shell breakage, it was generally necessary to break up the dams manually when they occurred, a procedure which required excessive labor and resulted in inefficiencies in the use of the apparatus. The broken shells are objectionable in any apparatus in which bivalves intended to be raw after treatment, are subjected to high temperatures as part of the processing, because the broken shells result in at least partially cooked and hence down-graded bivalves.

It is accordingly a general object of the present invention to feed clams and other mollusks from an adequately large supply to a processing apparatus, reliably and in a single file having a predetermined orientation.

Another important object is to accomplish the delivery of mollusks without subjecting them to damagingly high levels of vibration.

Still another object is to provide a continuous flow of mollusks independently, within broad limits, of the quantity available in the supply.

In the achievement of the foregoing objects, a feature of the invention relates to the construction of a supply reservoir in the form of a hopper and its positional relationship to a discharge chute which delivers the mollusks to a downstream processing apparatus. The hopper is provided with an elevator means by which it is raised gradually from a low level when it is filled with a maximum supply of clams to a level such that the top of the clam supply is always maintained above the upper end of the chute. A suitably contoured opening in the front wall of the hopper together with back and side walls which slope downwardly toward the front wall opening, when combined with the action of the elevator means, causes delivery of clams to the chute to be from the top of the supply regardless of the quantity of clams in the hopper.

According to another feature, the chute is mounted in slightly spaced relationship with the hopper and is provided with a controllable vibratory device, which may be switched on and off as needed to prevent the formation of dams or to eliminate such stoppages.

The foregoing objects and features, together with numerous advantages of the present invention, will be more fully understood and appreciated from the following detailed description of an illustrative embodiment taken in connection with the accompanying drawings in which:

FIG. 3 is a detail view in perspective showing details of construction of the chute.

Figure 1:
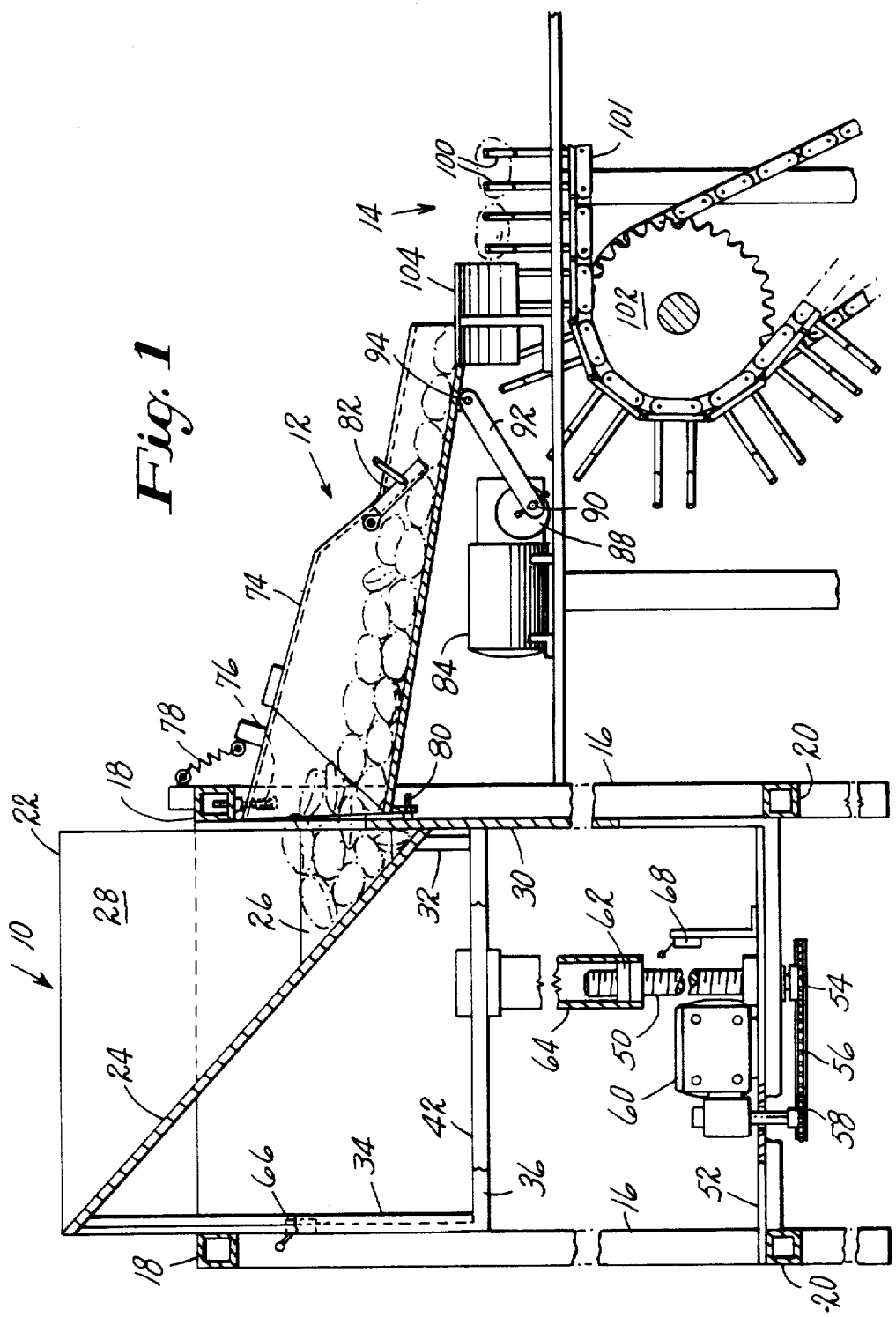
FIG. 1 is a view in side elevation and partly in cross section of an apparatus for dispensing mollusks, according to the present invention and including a hopper and a delivery chute.

Turning now to the drawings, there is shown a supply apparatus according to the present invention, including hopper and chute assemblies indicated generally at 10 and 12 respectively, for supplying mollusks to a processing apparatus indicated generally at 14. As shown fragmentarily in the drawings, the apparatus 14 is a shucking apparatus according to the above identified Patent, which forms no part of the present invention but is shown for the purpose of providing a destination for the mollusks delivered by the chute 12. In practice, the present apparatus could be cooperatively associated with other apparatus requiring an uninterrupted supply of mollusks or other articles, if any, having similar characteristics.

The hopper assembly 10 includes a stationary base in the form of a weldment comprising a set of four legs 16 interconnected by upper and lower stretchers 18 and 20 respectively to define a vertical guideway in which a hopper or bin 22 is slidable. The bin 22 is formed with an open front or discharge side and with a sloping rear side wall 24 which cooperates with a pair of opposed inclined bottom panels 26 to center reduced quantities of mollusks for discharge to the chute assembly 12. The sides of the bin 22 are closed by vertical walls 28 and the front by a stationary wall 30, fixedly secured to the inside of the front legs 16. There is also provided a reinforcing framework for the bin 22, comprising short front and longer rear posts 32 and 34 respectively, rising from a base frame including longitudinal stretchers 36 and cross stretchers 38. There are also included in the reinforcing framework a vertical flat 40 extending upwardly from the central portion of the stretcher 38 to the upper edge of the rear side 24, and a horizontal plate 42 extending between the two cross stretchers 38 and forming a part of a connection between the hopper and an elevating mechanism to be described. The guideway for the hopper 22 also includes a pair of opposed side plates, one of which is seen at 46, fixedly mounted on the legs 16.

Figure 2:
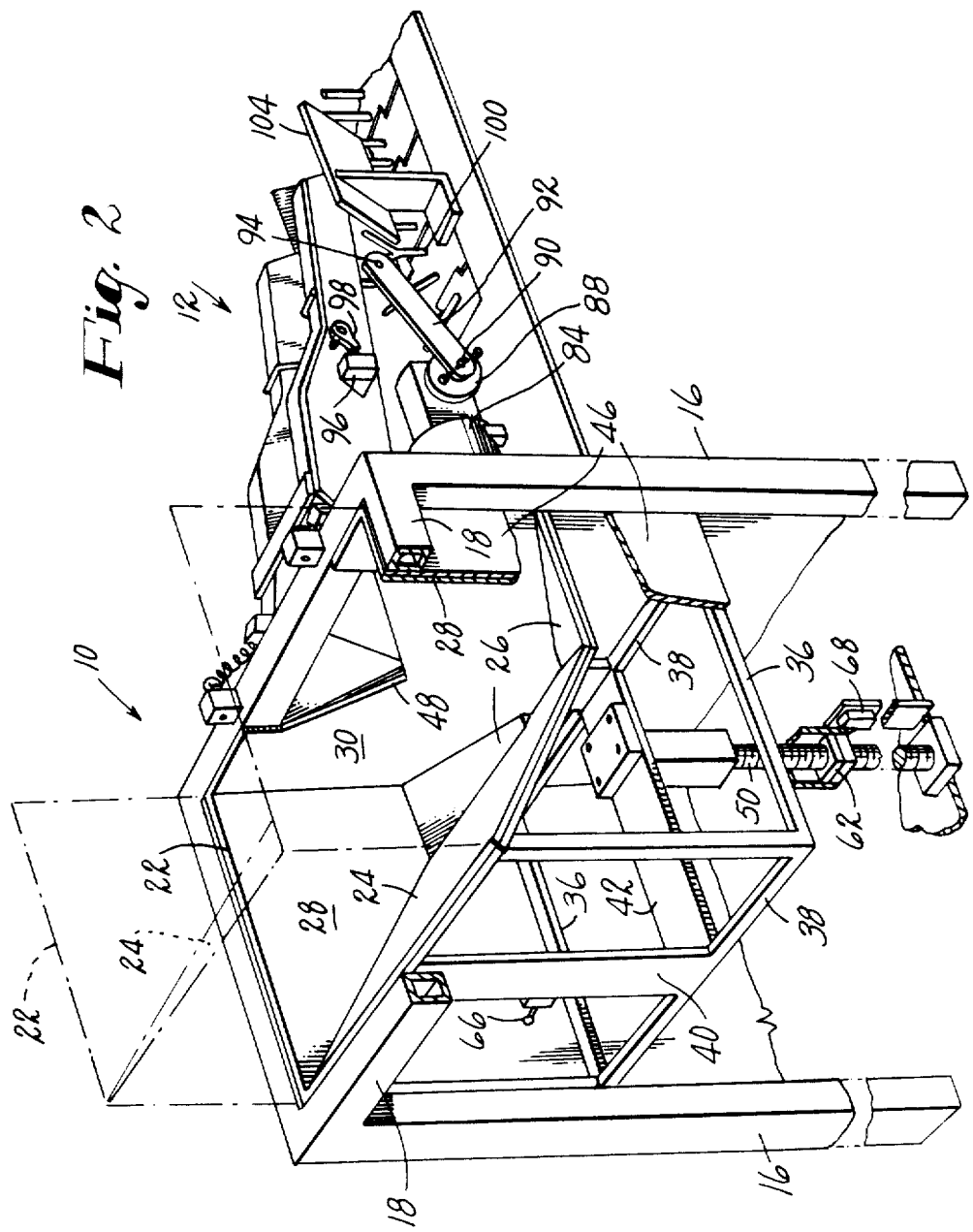
FIG. 2 is a view in perspective as seen from the upper left of FIG. 1, showing the interior of the hopper and the relationship of the the input end of the chute with the hopper and of the discharge end of the chute with a processing apparatus.

When the hopper 22 is to receive a load of mollusks, it is in the position depicted in full lines in FIG. 2. In that position, if the hopper is full, mollusks are discharged from the top of the supply in the hopper into the chute assembly 12 through a Vee-shaped notch 48 in the front wall 30. As the quantity of mollusks in the hopper 22 diminishes to a point where the top is not sufficiently above the notch 48 that the mollusks may feed by gravity, the hopper is raised in steps as needed and under the control of an operator, eventually reaching the level depicted in dot and dash lines in FIG. 2. For this purpose, there is provided beneath the hopper 22, a power-operated jack comprising a vertical screw 50 journalled in a plate 52, fixedly supported on the stretchers 20. The screw 50 extends through the plate 52 and is provided at its lower end with a sprocket 54 driven through a chain 56 by a sprocket 58 mounted on the lower end of a vertical output shaft of a motor reducer 60. The screw 50 is coupled to the hopper 22 by a nut 62 affixed to the interior of the lower end of a tube 64, fixedly depending from the plate 42. The motor of the reducer 60 is reversible in direction and upper and lower limit switches 66 and 68 respectively are connected in series with the appropriate windings of the motor to prevent any overtravel of the hopper 22 in either direction. The energization of the reducer motor is accomplished by a manually operated switch, not shown, or alternatively, the reducer motor may be energized automatically in a manner hereinafter to be described.

The chute assembly 12 includes a chute 74 which is suspended on a pair of screws 76 adjustably fixed in the upper front stretcher 18. The screws 76 pass loosely through a flange in the chute 74, thus allowing the chute to move up and down as will be explained, while maintaining the inlet or upper end of the chute aligned with the notch 48 in the front wall 30. The upper end of the chute is urged upwardly by a pair of tension springs 78 extending between both sides of the chute and the stretcher 18. At the underside of the chute 74 is an adjustable rubber headed bumper 80 which limits the motion of the chute toward the hopper 10 and also imparts a shock to the front of the hopper to assist in dislodging clams which may form blockages as already indicated, because of their size and shape. Inside the chute 74 is a pivotally mounted gate 82, which performs the two functions of aligning the clams in a single file at the lower end of the chute and of providing a signal when the movement of clams to the lower end of the chute is interrupted.

In order to assist gravity in causing clams in the chute to move toward the lower discharge end, there is provided a vibratory mechanism including a prime mover in the form of a motor reducer 84 fixedly supported on a base plate 86, secured to the the legs 16. The reducer 84 drives a crank disk 88 adjustably connectible to a pivot pin 90 which may be located at various distances from the center of rotation of the disk 88 to vary the effective throw of the pin 90. A connecting rod 92 is fitted to the pin 90 at one of its ends and at the other is pivotally connected at 94 to the underside of the chute 74. Depending on the type of product which is being processed, whether clams, oysters or scallops together with their size and other characteristics, the vibratory mechanism may be operated either continuously or intermittently and the amplitude of vibration may also be adjusted. As already indicated, the pin 90 is adjustably fixable at varying distances from the center of the disk 88. This is accomplished by securing the pin 90 at an appropriate distance from center in a radial slot in the disk. For providing continuous operation of the vibratory mechanism, a first energizing circuit for the motor reducer 84 includes a manually operable on-off switch, not shown but of conventional design. Alternatively, a second circuit includes a normally open switch 96 connected in series with the motor. The switch 96 is closed by an arm 98 which pivots in a clockwise direction when the gate 82, which is appropriately weighted for the purpose, swings to a vertical position when no clams are present to impede its movement. Thus, by the use of the alternative circuit, the motor reducer 84 may be energized automatically only when clams are not available at the lower end of the chute, an important factor in minimizing broken shells of fragile mollusks. A corresponding reduction in the vibratory amplitude of the chute is another factor in reducing the incidence of broken shells under certain conditions. In addition, the switch 96 may also be used to control the raising of the hopper 22 by employing a double pole, single throw switch and connecting a time delay device in series with the normally open contacts which provide an alternative circuit for energizing the motor reducer 60. When the alternative circuit for energizing the motor reducer 60 is employed, the motor is energized if no clams are present at the gate 82 after a brief time delay following the start of the vibratory mechanism.

From the chute 74, in the present environment, the clams are delivered to Y-shaped supports 100 of the shucking apparatus 14 in a single file to be carried through the apparatus by a pair of successive supports 100 mounted on a chain 101 driven in the direction of the arrow over a sprocket 102, forming a part of a closed course with other sprockets, not shown. Guidance of the clams from the chute 74 to the supports 100 is accomplished by a stationary trough 104 mounted on the plate 86.

From the foregoing, it will be appreciated that a workable mollusk supply apparatus may comprise some parts of the present disclosure while others are omitted. For example, the automatic controls already described may be eliminated in a situation either requiring extreme care to avoid damaging the mollusks being processed or one in which the added labor involved in manual control is tolerable. The benefits to be derived from such considerations will be readily appreciated by those of ordinary skill in the art. It is therefore not intended that the foregoing description be taken in a limiting sense but rather that the scope of the invention be interpreted from the appended claims.

Having thus disclosed my invention, what I claim as new and desire to secure by Letters Patent of the United States is:

1. An apparatus for dispensing mollusks in a single file, comprising a hopper assembly including a hopper having a rigid stationary front wall formed with an outlet and movable rigid side and rigid rear walls and adapted to contain a quantity of mollusks, means including an inclined chute for dispensing mollusks in a single file, the chute having an upper end to which mollusks are supplied from the outlet of the hopper and a lower discharge end adapted to dispense the mollusks to a processing device, a prime mover, a crank having a variable throw and driven by the prime mover, and a connecting rod linking the crank to the underside of the chute.

2. An apparatus according to claim 1 further characterized in that the prime mover is an electrically powered motor reducer and further comprising means for interrupting power to the motor reducer in response to a continuing flow of mollusks while the remainder of the apparatus remains in operation, the power interrupting means including a pivoted gate in the chute and a motor-controling switch which is opened by mollusks flowing in the chute and pivoting the gate out of their path.

3. An apparatus according to claim 1 further characterized in that the chute is formed with a Vee-shaped cross-section and further comprising a pivotally mounted gate in the lower end of the chute for aligning the mollusks in a single file and a stationary Vee-shaped trough interposed between the chute and the processing device and cooperating with the chute and, the gate for delivering similarly oriented mollusks in a single file to the processing device.

4. An apparatus for dispensing mollusks substantially continuously, comprising a hopper assembly including a hopper adapted to contain a quantity of mollusks and having a stationary rigid front wall and vertically movable rigid side walls, rigid rear walls and rigid bottom panels, means defining a stationary outlet for mollusks in the front wall of the hopper, an inclined chute having an upper end adjacent the outlet and a lower discharge end adapted to dispense the mollusks to a processing device and elevator means for raising the movable walls of the hopper gradually to position the top of the supply of mollusks in the hopper above the outlet to maintain a substantially continuous flow of mollusks into the chute, whereby mollusks are propelled by gravity from the top of the supply in the hopper, through the outlet and down the chute.

5. An apparatus according to claim 4 further characterized in that the hopper in addition to the stationary front wall also includes as the movable walls two vertical sides, an inclined rear and sloping bottom panels for delivering mollusks to the outlet in the stationary front wall of the hopper.

6. An apparatus according to claim 4 further characterized in that the hopper assembly comprises a stationary base defining a vertical guideway in which the movable walls of the hopper are slidable and in which the elevator means for raising the movable walls of the hopper is power driven.

7. An apparatus according to claim 6 further characterized in that the elevator means for raising the movable walls of the hopper comprises a power-driven screw mounted on the base and a nut supported on the underside of the hopper and in threaded engagement with the screw.

8. An apparatus according to claim 4 further characterized in that the chute has a Vee-shaped cross-section and is free to move with respect to the hopper assembly and further comprising vibratory means connected to the chute to assist gravity in propelling mollusks in the chute toward the discharge end.

9. An apparatus according to claim 8 further characterized in that the vibratory means is variable in the amplitude of vibration imparted to the chute and further comprising means for interrupting the action of the vibratory means while the remainder of the apparatus remains in operation.

* * * * *